UNITED STATES PATENT OFFICE.

SOLOMON GANELIN, OF PHILADELPHIA, PENNSYLVANIA.

WHITE-PIGMENT SUBSTITUTE FOR WHITE LEAD AND METHOD OF MAKING SAME.

SPECIFICATION forming part of Letters Patent No. 558,942, dated April 28, 1896.

Application filed June 30, 1894. Renewed August 26, 1895. Serial No. 560,600. (No specimens.)

*To all whom it may concern:*

Be it known that I, SOLOMON GANELIN, a subject of the Czar of Russia, and a resident of Philadelphia, in the county of Philadelphia and State of Pennsylvania, have invented a new and useful White-Lead Substitute and Method of Making the Same, of which the following is a specification.

The principal objects of my present invention are, first, to provide a satisfactory, acceptable, and comparatively inexpensive substitute for ordinary white lead (hydrated carbonate of lead) which shall possess qualities of body, color, bulk, &c., equal and in some respects superior to ordinary white lead, and, second, to provide an expeditious, practical, and simple method of manufacturing my improved white-lead substitute without exposing the workmen to the dangers of lead poisoning.

To this end my invention comprises a white-lead substitute consisting of the chemical compound oxychlorocarbonate of lead; and my invention further comprises the method of producing this oxychlorocarbonate of lead or white-lead substitute, which consists in treating oxychlorid of lead with an alkaline corbonate or bicarbonate in such quantities that the carbonate or bicarbonate does not replace the entire amount of chlorin of the oxychlorid and separating the soluble from the insoluble matter in the resultant product.

My improved white-lead substitute or admixture is more readily produced than white lead of commerce, and it may be prepared from oxychlorid of lead by the addition thereto of alkaline carbonate or bicarbonate in such quantities that there is not sufficient carbonate or bicarbonate present for replacing the chlorin of the oxychlorid of lead. By this mode of procedure there is formed an insoluble admixture or compound of oxychlorid of lead and oxycarbonate of lead and a soluble salt, the reaction being shown by the following equations:

1. $3PbOHCl + Na_2CO_3 = Pb(OH)_2 \cdot PbCO_3 \cdot Pb(OH)Cl + 2NaCl$.

2. $2PbOHCl + NaHCO_3 = PbCO_3 \cdot Pb(OH)Cl + NaCl + H_2O$.

3. $4Pb(OH)Cl + Na_2CO_3 + NaHCO_3 = Pb_2(OH)_2CO_3 \cdot PbCO_3 \cdot Pb(OH)Cl + 3NaCl + H_2O$.

However, the foregoing equations are general and are not intended to be exact, but are stated merely for purpose of description.

Upon the completion of the above-mentioned reaction the precipitate, which comprises the chemical compound or admixture oxychlorocarbonate of lead, may be filtered and washed and dried and preserved for use as a substitute pigment for white lead. It has been stated that this insoluble product is a chemical admixture or compound, and if the oxychlorid of lead from which it was obtained in the manner above described was not pure, but contained sulfate or oxysulfate of lead, then there would be present in the insolvent product sulfate or oxysulfate of lead as well as oxychloride and oxycarbonate of lead. However, I desire it to be understood that my invention covers a chemical compound composed of oxychlorid and oxycarbonate of lead, or, in other words, oxychlorocarbonate of lead, whether sulfate or oxysulfate be present therein or absent therefrom, so that a compound of oxycarbonate and oxychlorid in which sulfate or oxysulfate is present and one from which sulfate or oxysulfate is absent are equally within the scope of my invention.

The following facts, as well as others which might be referred to, demonstrate conclusively that my white-lead substitute is a chemical compound, and not a mere mechanical mixture of oxychlorid of lead and oxycarbonate of lead. First, no part of it is dissolved, even when it is permitted to remain in water for a comparatively long time, whereas some of the oxychlorid of lead would under similar circumstances be dissolved, and, second, the properties of my improved white-lead substitute closely resemble, and in many respects excel, those of ordinary white lead. Like ordinary white lead, my new pigment is an undetermined chemical compound. White lead cannot be obtained by merely mixing a carbonate of lead and hydrate of lead, but must be obtained indirectly. In the same manner a mere mechanical mixture of oxychlorid of lead and oxycarbonate of lead will not produce a compound or substance possessing the properties of my new pigment; in fact, the latter, like white lead, may be obtained only by indirect means. Moreover, when carbonate of soda is added to oxychlorid of lead in pursuance of my invention the reaction at first takes place rapidly and nearly quantitatively, and further additions of alkaline carbonate act more slowly, until at length it becomes almost impossible to effect the conversion of any more of the oxychlorid of lead into oxycarbonate of lead. Clearly this would not be the case if my improved compound were simply a mechanical mixture, for in the latter case the reaction would take place with equal readiness at all stages, and the conversion of the alkali carbonate into the alkali chlorid would be complete.

It will be obvious to those skilled in the art to which my invention relates that modifications may be made without departing from the spirit thereof. Hence I do not limit myself to the precise details hereinabove set forth; but,

Having thus described the nature and object of my present invention, what I claim as new, and desire to secure by Letters Patent, is—

1. A new and useful white-lead substitute to wit, the chemical compound, oxychlorocarbonate of lead.

2. The herein-described method of making a substitute for white lead to wit, oxychlorocarbonate of lead which consists in treating oxychlorid of lead with an alkaline carbonate or bicarbonate in such quantities that the carbonate or bicarbonate does not replace the entire amount of chlorin of the oxychlorid, and separating the soluble from the insoluble matter in the resultant product.

In testimony of which invention I have hereunto set my hand.

SOLOMON GANELIN.

Witnesses:
   FREDK. A. GEUTH, Jr.,
   PHILIP ROSENAU.